United States Patent Office 2,734,041
Patented Feb. 7, 1956

2,734,041

COMPOSITIONS OF MATTER COMPRISING ACRYLONITRILE POLYMERS DISSOLVED IN MIXTURES OF ETHYLENE CARBONATE AND WATER

Evan Islwyn Jones and Stanley Minor Todd, Blackley, Manchester, England, assignors to Imperial Chemical Industries Limited, a corporation of Great Britain No Drawing. Application March 1, 1954,
Serial No. 413,366

Claims priority, application Great Britain March 13, 1953

4 Claims. (Cl. 260—29.6)

This invention relates to new and improved compositions comprising acrylonitrile polymers.

It is known to use ethylene carbonate as a solvent for acrylonitrile polymers. We have now found that acrylonitrile polymers can be dissolved in a mixture of ethylene carbonate and water.

According to the present invention therefore we provide new and improved compositions comprising an acrylonitrile polymer, ethylene carbonate and water.

The present invention also comprises the production of shaped articles from such compositions.

To obtain solutions having a polymer concentration sufficiently high for spinning into fibres or casting into films it is necessary to have an excess of ethylene carbonate present, preferably more than 60% by weight of the ethylene carbonate/water mixture.

In the spinning of fibres from the compositions of this invention usual coagulative spinning processes are used. The coagulating bath may comprise any suitable liquid such as an aliphatic dihydric alcohol or a metal salt solution, but water is preferred because of its availability, cheapness and the excellent fibres obtained. It will be appreciated that as spinning proceeds ethylene carbonate will collect in the bath, and, after a time, particularly if the bath is heated, a little ethylene glycol will be present as a result of decomposition of the ethylene carbonate. It is preferred that the total ethylene carbonate content should be kept substantially constant in the bath (although a concentration gradient may exit along the bath).

By the phrase "acylonitrile polymer" we include polyacrylonitrile, copolymers and interpolymers of acrylonitrile and other vinyl compounds containing a major proportion of acrylonitrile in the polymer molecule. For the manufacture of fibres it is preferred that the acrylonitrile polymer should contain at least 80% acrylonitrile in the polymer molecule.

The following examples in which all parts are by weight, illustrate but do not limit the scope of our invention.

Example 1

18 parts (by weight) of powdered polyacrylonitrile were added slowly to 182 parts of ethylene carbonate while stirring at 45° C. 0.36 gm. of salicylic acid had previously been incorporated with the solvent to act as stabiliser. The slurry was heated to 95°–100° C. and maintained at this temperature for half an hour. At the end of this period the solution had a falling-sphere viscosity of 72 poises at 88° C.

In a separate experiment 20 parts of the above powdered polyacrylonitrile were added slowly to 180 parts of an 80/20 mixture of ethylene carbonate and water at 25°–30° C. (to which 0.36 gm. of salicylic acid stabiliser had been added.) The slurry was heated to 95°–100° C. and maintained at this temperature for half-an-hour. At the end of this period a clear solution having a falling-sphere viscosity of 84 poises at 88° C. and suitable for spinning into fibres was obtained.

Example 2

20 parts of a copolymer powder consisting of 95/5 acrylonitrile/vinyl pyridine were added slowly to well-stirred 180 parts of ethylene carbonate (plus 0.2% salicylic acid) at 45° C. After heating to 95°–100° C. for half-an-hour the solution had a falling-sphere viscosity of 32 poises at 88° C.

In a separate experiment the above powdered copolymer (22 parts) was mixed with 178 parts of an 80/20 mixture of ethylene carbonate and water (plus 0.2% salicylic acid stabiliser) at 25°–30° C. The slurry was heated to 95°–100° C. and maintained at 95°–100° C. for half-an-hour, to give a clear solution of falling-sphere viscosity 23 poises at 88° C., suitable for spinning into fibres.

Example 3

22 parts of an interpolymer consisting of 90/5/5 of acrylonitrile/vinyl pyridine/4-dioxolanyl methyl methacrylate, in finely powdered form, were added slowly to 178 parts of ethylene carbonate (containing 0.2% dissolved salicylic acid stabiliser) at 45° C. while rapidly stirring. The slurry was heated to 95°–100° C. and maintained at 95°–100° C. for hauf-an-hour. The resulting solution had a falling-sphere viscosity of 36 poises at 88° C.

In a separate experiment the above interpolymer (24 parts) was gradually added, in powder form, to an 80/20 mixture of ethylene carbonate and water (176 parts) containing 0.2% dissolved salicylic acid. The solvent mixture was stirred vigorously during the addition. The slurry so formed was heated from the addition temperature of 25°–30° C. to 95°–100° C. and maintained at this temperature for half-an-hour to form a clear solution having a falling-sphere viscosity of 36 poises at 88° C., suitable for spinning into fibres.

Example 4

18 parts of a copolymer consisting of 88/12 acrylonitrile/4-dioxolanyl methyl methacrylate, in finely powdered form, were added slowly to 182 parts of ethylene carbonate (plus 0.2% salicylic acid) at 45° C., with vigorous stirring. The slurry was heated to 95°–100° C. for half-an-hour, to give a solution having a falling-sphere viscosity of 53 poises at 88° C.

In a separate experiment 20 parts of the above copolymer, in finely powdered form, were mixed in a similar manner with 180 parts of a mixture consisting of 80/20 ethylene carbonate and water (plus 0.2% salicylic acid) at 25°–30° C. The slurry was heated to 95°–100° C. and maintained at 95° C. for half-an-hour to give a clear solution of falling-sphere viscosity 42 poises at 88° C. suitable for spinning into fibres.

Example 5

20 parts of a copolymer of acrylonitrile and 4-dioxolanyl methyl methacrylate (88/12) in finely powdered form, were gradually added to a mixed solvent comprising 153 parts ethylene carbonate, 27 parts water and 0.31 part dissolved salicylic acid at 25°–30° C. with vigorous stirring. The slurry so formed was stirred at this temperature for 10 minutes, and then heated to 95° C. over a period of 25 minutes to form a viscous solution. Stirring was continued for 30 minutes at 95°–100° C. to disperse gel particles and a clear, homogeneous solution suitable for fibre or film formation was obtained having a viscosity at 88° C. of 51 poises by the falling-sphere method.

When making solutions of an acrylonitrile polymer, e. g. for use in spinning artificial fibres, it is common practice to form a slurry of the polymer in the cold solvent and then to heat to obtain a clear solution. Using the compositions of our invention we have found that by adding the water to the polymer first, the necessity of forming a slurry is avoided as the water wet polymer dissolves in hot ethylene carbonate. This is illustrated in Examples 6 and 7.

Example 6

22 parts of a copolymer composed of 95 parts acrylonitrile and 5 parts 2-vinyl pyridine were mixed with 35.6 parts of water to form a wet powder at room temperature. 142.4 parts of ethylene carbonate were mixed with 0.36 part of salicylic acid and the mixture heated to 70° C. while stirring vigorously. All the wet polymer powder was added slowly to the hot ethylene carbonate while stirring and the polymer dispersed and went into solution at 60° C. Heating and stirring were continued to a solution temperature of 95° C., this taking 25 minutes, and the solution was stirred at 95°–100° C. for a further 30 minutes. The viscosity as measured by the falling-sphere method was 27 poises at 88° C., and the solution was clear, homogeneous and suitable for spinning into fibres.

Example 7

20 parts of finely powdered polyacrylonitrile were wetted out with 45 parts of water at room temperature. 135 parts of ethylene carbonate were mixed with 0.27 part of salicylic acid and heated, while stirring vigorously, to 70° C. The wet polymer powder was added to the hot ethylene carbonate at 70° C. and the polymer dispersed and dissolved rapidly. The solution was heated to 95° C. and stirred at 95°–100° C. for 30 minutes to form a clear homogeneous solution suitable for spinning into fibres or casting into films, having a viscosity of 59 poises at 88° C. by the falling-sphere method.

Example 8

A copolymer consisting of 95/5 acrylonitrile/vinyl pyridine was dissolved in ethylene carbonate to form a 10% solution having a viscosity, by the falling-sphere method, of 32 poises at 88° C. and a setting point of 40° C. It was extruded at 85° C. through a 40/0.100 mm. spinneret at the rate of 9 gm./minute into water at 90°–95° C. The coagulated filaments were led through the bath for 65 inches and wound several turns round a capstan-separator roll system before collection on a bobbin. The wind-up speed was 27.5 ft./min. (stretch ratio 0.38) and the tension on the yarn in the bath was less than 5 gm. After washing the yarn in hot water (approximately 60° C.) overnight it was dried continuously on a hot roll/separator roll system at 170° C. and drawn from the end of the roll 7 times. The feed rate was 20 ft./minute. The resulting drawn yarn had a denier of 166 and a tenacity of 2.6 gm./denier at 5.9% extension.

Attempts to spin at higher throughput rates were unsuccessful; and the solution failed to spin into a 13% aqueous ethylene carbonate coagulating bath, the coagulation rate being too slow and the resulting weak filaments could not be drawn away from the spinneret.

Example 9

In contrast a 11.5% solution of the copolymer, as used in Example 8, in 80/20 ethylene carbonate/water, of viscosity 51 poises at 88° C. could be spun satisfactorily into a coagulating bath consisting of 13% ethylene carbonate in water initially. The solution temperature (85° C.), spinneret (40/0.100 mm.) and tension (less than 5 gm.) were the same as used in Example 8. The bath temperature was 75°–80° C., length 96 inches, and the wind-up speed 67 ft./minute (stretch ratio 0.59). The coagulating liquor was replenished by adding 13% ethylene carbonate/water liquor continuously near the spinneret and withdrawing spent liquor at the far end of the bath. The liquor take-off rate was 60 cc./minute and the liquor contained approximately 21–22% ethylene carbonate according to density measurement.

The yarn after washing overnight in running hot water (approximately 60° C.) was dried continuously over a hot roll/separator roll system at 170° C. (feed rate 15 ft./minute) and drawn 6 times from the end of the roll, then relaxed 10% through a hot slot at 190° C. The resultant yarn had a denier of 135 and a tenacity of 3.3 gm./denier at 10.9% extension.

Example 10

A 10% solution of polyacrylonitrile in ethylene carbonate, having a falling-sphere viscosity of 77 poises at 100° C., was extruded at the rate of 16.8 gm./minute through a 40/0.100 mm. spinneret into a water bath, 30 inches long. The yarn travelled a distance of 22 inches in the bath liquor and was tensioned by means of guides at distances of 10 inches and 20 inches from the spinneret face. The yarn was collected on bobbins at 85 ft./minute (stretch ratio 0.6), under 10 gm. spinning tension, and at 127 ft./minute, (stretch ratio 0.9), under 25 gm. spinning tension. The two yarns were washed overnight in running hot water (approximately 60° C.) to give yarns of low tenacity and lustre. These were drawn through a hot slot at 175° C. to give lustrous yarns of good tensile properties. The former yarn drew 6 times to a denier of 109, and tenacity 2.6 gm./denier at 6.3% extension, while the latter yarn drew 5 times to 90 denier and 2.8 gm./denier tenacity at 6.2% extension.

Spinning was not possible at an extrusion rate of 28 gm./minute.

A 9% solution of the same polymer in ethylene carbonate had a falling-sphere viscosity of 84 poises at 88° C. and failed to coagulate quickly enough to permit spinning into a 13% ethylene carbonate/water bath at 85° C. Raising the solution temperature had no appreciable effect on coagulation.

Example 11

A 10% solution of polyacrylonitrile in 80/20 ethylene carbonate/water, of falling-sphere viscosity 57 poises at 88° C., was extruded at 85° C. through a 40/0.100 mm. spinneret at the rate of 18 gm./minute into a bath initially containing 13% ethylene carbonate in water at 80–85° C. The yarn coagulated satisfactorily in this bath and was led a distance of 96 inches through the bath liquor under minimum tension, being collected on a bobbin at 81 ft./minute (stretch ratio 0.6). The yarn was washed overnight in running hot water and dried on a hot roll then drawn 6 times through a hot slot at 190° C. and relaxed 10% at 190° C. using the same hot slot. The resulting drawn yarn had a denier of 171, and a tenacity of 2.2 gm./denier at 9.9% extension.

During the spinning the bath liquor was refortified by adding 13% ethylene carbonate/water liquor continuously near the spinneret and withdrawing spent liquor at the other end of the bath at the rate of 100–150 cc./minute. The ethylene carbonate content of the overflow liquor, as measured by density measurement was 21%.

From the foregoing examples it can be seen that a considerable portion of ethylene carbonate can be replaced by water without in any way impairing the efficiency of its solvent action. The proportion of ethylene carbonate to polymer is in this way considerably reduced, leading to more economical spinning.

It is also shown that when solutions of acrylonitrile polymers are spun into fibres from 100% ethylene carbonate, the fibres so made do not coagulate rapidly even in water, are very weak, and difficulty is experienced in the first winding operation. On the other hand fibres spun from solution of the same polymers in an ethylene carbonate/water mixture can be coagulated rapidly in a water-bath or in an ethylene carbonate/water bath and the fibres so made can be stretched and subjected to all the usual textile operations to form yarns having excellent textile properties. For example, an attempt to spin fibres from a solution of an acrylonitrile 2-vinyl pyridine, 4-dioxolanyl methyl methacrylate (90:5:5) interpolymer, using 11 parts of interpolymer in 89 parts of ethylene carbonate, was unsuccessful. Various coagulating bath temperatures were tried ranging from 25° C. to 95° C. in conjunction with a variety of extrusion rates from 9 to 24 gms. per minute. Water and various water/ethylene carbonate mixtures were tried as the coagulating bath. In all cases the coagulation was too slow and incomplete for the yarn to be collected. Using an ethylene carbonate/water mixture (80:20) as solvent, 12 parts of the same interpolymer in 88 parts of the ethylene carbonate/water mixture was spun into filaments using an ethylene carbonate/water (13/87) coagulating bath, without difficulty. The 40-filament yarn was taken from the bath under a tension of 0.1 gms. per denier, wound on a bobbin, washed, dried and then drawn into yarn, having excellent textile properties.

As shown in the examples when using polyacrylonitrile as opposed to an interpolymer, we have found it possible to spin yarns from ethylene carbonate alone, but only by a careful selection of conditions, including high solution temperature before extrusion and relatively low wind-up speeds. The use of high temperature tends to bring about decomposition of ethylene carbonate while the low wind-up speed limits the rate of commercial production. Using solutions made from the compositions of our invention, these difficulties do not arise.

Another advantage which results from the use of ethylene carbonate/water mixtures arises from the fact that when the polymer is made it need not be carefully dried before dissolving in the solvent, provided that the amount of water present in the polymer is allowed for when making the solution. As acrylonitrile polymers can be made most easily by polymerising in an aqueous medium the washing of the polymer can be considerably reduced and furthermore it need not be dried. The elimination of the drying step prevents the formation of hard, horny, difficultly soluble crumbs, which tend to form during drying, and exposure of the polymer to high temperatures at this stage, leading to discolouration is avoided. The undried product is easily dispersed in the solvent after only a simple sieving operation and no grinding is necessary. Just as the polymer can be used while still wet, so also can the ethylene carbonate. In making up the original solution it is not necessary to use anhydrous ethylene carbonate as long as the water content is known. For the spinning of fibres water coagulating-baths are used and gradually their ethylene carbonate content increases. The ethylene carbonate can be recovered from this coagulating bath, and again it is not necessary to dry the ethylene carbonate carefully before it can be re-used.

What we claim is:

1. A composition for spinning filaments and yarns of acrylonitrile polymer, said composition comprising a solution of an acrylonitrile polymer dissolved in a mixture of ethylene carbonate and water containing more than 60% by weight of ethylene carbonate, said polymer being selected from the group consisting of polyacrylonitrile and copolymers and interpolymers of acrylonitrile and a minor amount of at least one other vinyl compound said interpolymers being prepared solely from monomeric compounds.

2. A composition according to claim 1 wherein the acrylonitrile polymer is made into a solution by first mixing with water and then dissolving in hot ethylene carbonate.

3. A composition according to claim 1 wherein the copolymer is an acrylonitrile/vinyl pyridine copolymer.

4. A process for the continuous spinning of filaments and yarns comprising the steps of dissolving an acrylonitrile polymer selected from the group consisting of polyacrylonitrile and copolymers and interpolymers of acrylonitrile and a minor amount of at least one other vinyl compound said interpolymers being prepared solely from monomeric compounds, in a mixture of ethylene carbonate and water containing more than 60% by weight of ethylene carbonate whereby a spinning solution is formed, and thereafter extruding said solution into a coagulating bath.

References Cited in the file of this patent

FOREIGN PATENTS 896,083     France                 Apr. 17, 1944